April 18, 1950 C. A. SUNDSTRAND 2,504,164
GRASS CLIPPER
Filed April 10, 1944 2 Sheets-Sheet 1
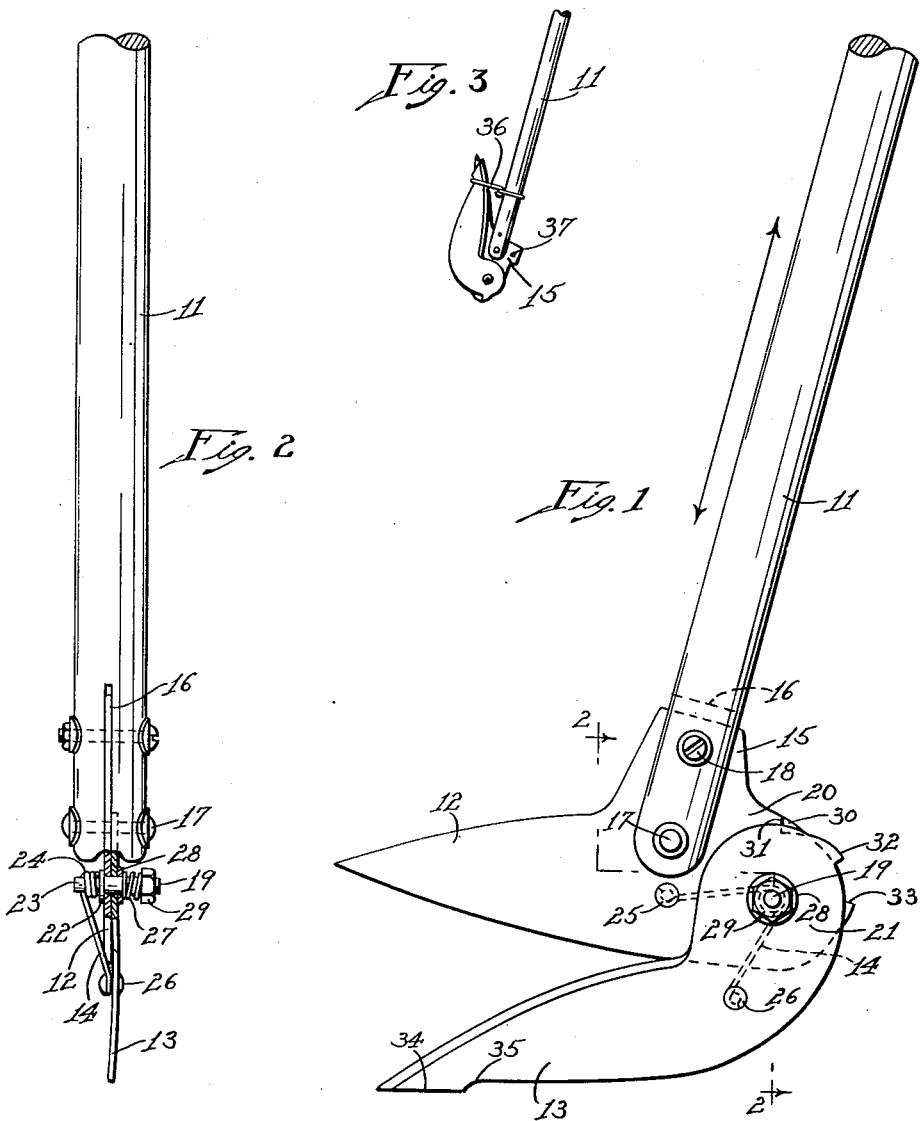
Inventor:
Carl A. Sundstrand April 18, 1950   C. A. SUNDSTRAND   2,504,164
GRASS CLIPPER
Filed April 10, 1944   2 Sheets-Sheet 2
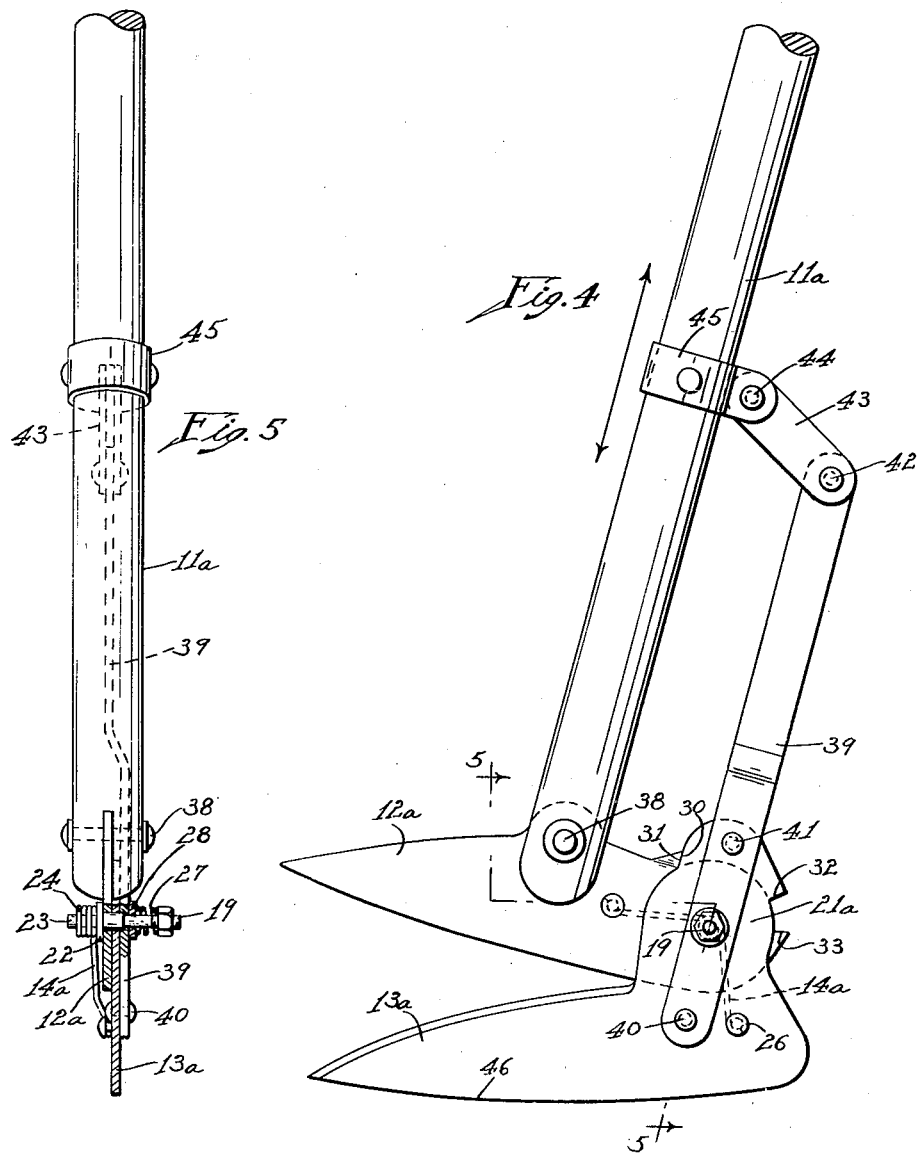
Inventor:
Carl A. Sundstrand Patented Apr. 18, 1950

2,504,164

UNITED STATES PATENT OFFICE 2,504,164

GRASS CLIPPER

Carl A. Sundstrand, Rockford, Ill.

Application April 10, 1944, Serial No. 530,271

10 Claims. (Cl. 56—241)

This invention relates to an improved grass clipper.

Hand shears and similar tools provided in the past for trimming along walks and curbs and around flower beds make such work extremely fatiguing, due to the amount of stooping involved and the amount of force required to operate the handles of the shears. It is therefore the principal object of my invention to provide a grass clipper which is designed for operation as the operator walks along, the operating force being applied usually by downward thrust on the end of a long handle in such a way that the operator can apply his weight advantageously and there is nothing about the operation tending to cause any noticeable fatigue.

Another object of my invention is to provide a grass clipper in which the shear blades are so pivoted with respect to one another and operatively connected with the operating handle that relatively light pressure is required in the operation of the clipper, the shear blades being manually closed, and having spring means tending to open the same.

The invention is illustrated in the accompanying drawings, in which—

Fig. 1 is a side view of a grass clipper made in accordance with my invention, the upper portion of the handle being broken away to conserve space and permit showing the shear blades and the rest of the clipper on a larger scale;

Fig. 2 is a view partly in front elevation and partly in vertical section on the broken line 2—2 of Fig. 1;

Fig. 3 is a side view on a smaller scale, showing the complete tool with the shear blades in a closed and moved position, tied to the lower end portion of the handle for compactness in shipping;

Fig. 4 is a view similar to Fig. 1, showing a modified or alternative construction, and Fig. 5 is a view partly in front elevation and partly in vertical section on the broken line 5—5 of Fig. 4.

Similar reference numerals are applied to corresponding parts throughout the views.

Referring first to Figs. 1 to 3, the grass clipper illustrated is designed to be operated by downward pressure on the handle 11 as the operator walks along the edge of the sidewalk, the blades 12 and 13 being forced together by the downward pressure on the handle, and spread apart by a grasshopper-type spring 14. The blade 12 has an upwardly-projecting ear 15, entered in a slot 16 in the lower end of the handle 11, and a rivet 17 provides a permanent pivotal connection between the blade and handle at the lower extremity of the latter. A bolt 18 entered through registering holes in the lower end portion of the handle and the ear 15 holds the blade rigid with the handle, but is removable, as will soon appear, to permit folding the blades to the position shown in Fig. 3 for greater compactness in shipping. A bolt 19 provides a pivotal connection between the blades in rearwardly-spaced relation to the lower end of the handle, and is entered through registering holes in the rear end portions 20 and 21 of the blades. A stepped head 22 is provided on the bolt for abutment with the blade 12, and the reduced cylindrical portion 23 thereof provides a bearing for the coiled intermediate portion 24 of the grasshopper spring 14, one leg of which is attached by means of a rivet 25 to the blade 12 and the other leg of which is attached by a rivet 26 to the blade 13, both connections being in radially-spaced relation to the bolt 19, as clearly appears in Fig. 1. A coiled compression spring 27 and washer 28 are provided on the bolt on the other side of the blades, and a nut 29 threads on the reduced threaded end of the bolt so as to subject the spring 27 to a predetermined degree of compression and thus keep the blades 12 and 13 operating under predetermined spring pressure. With such a construction there is little or no danger of the nut 29 tending to work loose and drop off, but as a precaution, the projecting threaded end of the bolt 19 may be swedged, if desired, to prevent the nut backing off. A laterally bent lug 30 on the rear end portion 21 of the blade 13 is arranged to strike a shoulder 31 provided on the rear end portion 20 of the blade 12 to limit the opening of the blades under action of the spring 14. Another laterally bent lug 32 on the rear end portion 21 of the blade 13 is arranged to strike a shoulder 33 on the rear end portion 20 of the blade 12 to limit the closing movement of the blades.

In operation, the blade 13 has its lower edge portion 34 resting on the ground, and the handle 11, which is long enough to reach to the region of the chest of the operator, extends upwardly and rearwardly with respect to the blades at approximately the angle illustrated in Fig. 1, and the operator usually takes hold of the upper end portion of the handle with both hands and exerts a downward thrust on the handle to close the blade 12 with respect to the blade 13, against the action of the spring 14, whereby to cut whatever grass may be between the blades. The grass usually lies down across the edge of the walk so that the blades 12 and 13, working in a substantially vertical plane, will easily shear it off. Ordinarily it takes very little downward pressure on the handle to clip the small amount of grass usually encountered in the trimming of a lawn, but in the event an especially tough bit of grass is encountered, the operator will have no difficulty in cutting it because he can bring his weight to bear on the handle to do such work without straining himself. The fact that the handle is inclined rearwardly with respect to the blades and the blades are pivoted with respect to one another at a point behind the lower end of the handle and are opened by spring action is found to facilitate the operation of this tool a great deal because the blade 13 tends to hop forward, rabbit-like, upon each release of downward pressure to take the next advanced position along the edge of the walk or curb in the line of cutting. In other words, the operator finds he does not have to lift the tool after each operation; it jumps ahead automatically, thus greatly facilitating the operation and speeding up the work and rendering it much less fatiguing.

The shoulder provided at 35 on the lower edge portion of the blade 13 is intended for locating a rope or wire tie-band 36 passed around the lower end portion of the handle and the outer end portion of the blades when the blades are closed and folded as shown in Fig. 3 for compactness in shipping. The bolt 18, as previously stated, is removable for this purpose. When the tool reaches the hardware store or the ultimate consumer, the band 36 can be removed and the bolt 18 can be entered in the hole 37 in the ear 15 when the blade 12 is swung around to the proper position with respect to the handle as shown in Fig. 1.

The clipper shown in Figs. 4 and 5 is similar to that just described, its blades 12a and 13a being generally similar to the blades 12 and 13 and being arranged to be closed manually by means of the handle 11a and opened by action of the spring 14a. However, in this case the lower end of the handle is pivotally connected by means of a rivet 38 with the blade 12a instead of being rigidly attached thereto as the handle 11 in the other tool first described. An elongated arm 39 is riveted at 40 and 41 to the rear end portion 21a of the blade 13a and has pivotal connection, as at 42, at its upper end with one end of a link 43, the other end of which is pivotally connected, as at 44, with a collar 45 attached to the lower end portion of the handle. In that way the reciprocation of the handle 11a is in a direction substantially parallel to the arm 39, and there is no rocking of the handle with respect to the lower blade 13a as there is in the operation of the handle 11 with respect to the lower blade 13. However, in this tool the lower blade 13a is provided with a rocker bottom edge 46, whereby to provide a somewhat similar action. The advantages described with reference to the first tool are also obtained in large measure with this tool.

It is believed that the foregoing description conveys a good understanding of the objects and advantages of my invention. The appended claims have been drawn with a view to covering all legitimate modifications and adaptations.

I claim:

1. A grass clipper comprising a substantially vertical handle, a shear blade fastened to the lower end thereof in a substantially vertical plane and substantially at right angles to the handle, and a cooperating shear blade pivoted to the first blade behind the lower end of the handle and spring pressed normally to an open position, the pivoted blade serving as a pivoted ground-engaging foot for the grass clipper arranged under action of its spring to cause the device to tend to hop forwardly when downward pressure on the handle is relaxed after each downward movement of the handle for closing the blades.

2. A grass clipper, as set forth in claim 1, including means for limiting the pivotal movement of the pivoted blade with respect to the other blade.

3. A grass clipper comprising a substantially vertical handle, a shear blade attached to the lower end thereof in a substantially vertical plane and substantially at right angles to the handle, a cooperating shear blade pivoted to the first blade behind the lower end of the handle and spring pressed normally to an open position, the pivoted blade serving as a pivoted ground-engaging foot for the grass clipper arranged under action of its spring to cause the device to tend to hop forwardly when downward pressure on the handle is relaxed after each downward movement of the handle for closing the blades, and means on the second blade cooperating with the lower end portion of the handle to maintain said handle at a predetermined angularity with respect to said blade in the up and down movements of the handle.

4. A grass clipper, as set forth in claim 3, including means for limiting the pivotal movement of the pivoted blade with respect to the other blade.

5. A grass clipper comprising a substantially vertical handle, a shear blade normally fixed at right angles to the lower end of the handle in a substantially vertical plane, said blade having an attaching portion, means providing a pivotal connection between said handle and said attaching portion permitting pivotal movement of the blade to a position approaching parallelism with the lower end portion of the handle, a bolt removably insertable through registering holes in the handle and attaching portion to fasten the blade normally in right angle relationship to the handle, and a cooperating shear blade pivoted to the first blade.

6. A grass clipper comprising a substantially vertical handle, a shear blade normally fixed at right angles to the lower end of the handle in a substantially vertical plane, said blade having an attaching portion, means providing a pivotal connection between said handle and said attaching portion permitting pivotal movement of the blade to a position approaching parallelism with the lower end portion of the handle, a bolt removably insertable through registering holes in the handle and attaching portion to fasten the blade normally in right angle relationship to the handle, and a cooperating shear blade pivoted to the first blade, the second blade having a shoulder on the outer edge portion thereof, which, in the folded position of the blades, is disposed in upwardly spaced relation to the aforesaid pivotal connection between the handle and the first blade substantially as and for the purpose described.

7. A garden shear comprising a single upright elongated handle, an upper shear blade fixed to said handle on the lower end portion thereof in a substantially vertical plane, and a companion lower shear blade pivoted relative to the upper blade in operative shearing relation thereto and adapted to engage the ground so as to be actuated by downward movement of the handle, the pivoted lower blade tending normally to move to an open position.

8. A garden shear comprising a single upright elongated handle, an upper shear blade fixed to said handle on the lower end portion thereof in a substantially vertical plane, a companion lower shear blade pivoted relative to the upper blade in operative shearing relation thereto and adapted to engage the ground so as to be actuated by downward movement of the handle, and spring means tending normally to move the pivoted lower blade to open position.

9. A garden shear comprising a single upright elongated handle, an upper shear blade fixed to said handle on the lower end portion thereof in a substantially vertical plane, a companion lower shear blade pivoted relative to the upper blade in operative shearing relation thereto and adapted to engage the ground so as to be actuated by downward movement of the handle, the pivoted lower blade tending normally to move to an open position, and stop means positively limiting the pivotal movement of said lower blade.

10. A garden shear comprising a single upright elongated handle, an upper shear blade fixed to said handle on the lower end portion thereof in a substantially vertical plane, a companion lower shear blade pivoted relative to the upper blade in operative shearing relation thereto and adapted to engage the ground so as to be actuated by downward movement of the handle, spring means tending normally to move the pivoted lower blade toward open position, and stop means for positively limiting pivotal movement of said lower blade.

CARL A. SUNDSTRAND.

REFERENCES CITED

The following references are of record in the file of this patent:

UNITED STATES PATENTS

| Number | Name | Date |
|---|---|---|
| 798,307 | Taylor | Aug. 29, 1905 |
| 912,408 | Place | Feb. 16, 1909 |
| 1,741,172 | Huxman | Dec. 31, 1929 |
| 1,782,029 | Clark | Nov. 18, 1930 |
| 1,890,355 | Bailey | Dec. 6, 1932 |
| 1,891,694 | Svendsgaard | Dec. 20, 1932 |

FOREIGN PATENTS

| Number | Name | Date |
|---|---|---|
| 2,826 | Great Britain | Feb. 6, 1884 |